July 31, 1951 J. L. WAGNER ET AL 2,562,591

ELECTRONIC COUNTING CIRCUIT

Filed Dec. 5, 1947 3 Sheets-Sheet 1

INVENTORS
JOHN L. WAGNER
ROBERT E. LAWHEAD

BY A. J. Etienne

ATTORNEY

July 31, 1951 — J. L. WAGNER ET AL — 2,562,591

ELECTRONIC COUNTING CIRCUIT

Filed Dec. 5, 1947 — 3 Sheets-Sheet 2

INVENTORS
JOHN L. WAGNER
ROBERT E. LAWHEAD
BY A. J. Etienne
ATTORNEY

July 31, 1951 J. L. WAGNER ET AL 2,562,591

ELECTRONIC COUNTING CIRCUIT

Filed Dec. 5, 1947 3 Sheets-Sheet 3

INVENTORS
JOHN L. WAGNER
ROBERT E. LAWHEAD
BY A. J. Etienne
ATTORNEY

UNITED STATES PATENT OFFICE 2,562,591

ELECTRONIC COUNTING CIRCUIT

John L. Wagner, Endwell, and Robert E. Lawhead, Vestal, N. Y., assignors to International Business Machines Corporation, New York, N. Y., a corporation of New York Application December 5, 1947, Serial No. 789,798

9 Claims. (Cl. 250—27)

This invention relates to counting devices and more particularly to an electronic counter utilizing a series of trigger circuits, each of which comprises a pair of grid controlled tubes.

Each trigger circuit has two conditions of stability, an "off" or normal condition and an "on" or transferring condition. These conditions are assumed alternately in response to an input pulse having predetermined characteristics and impressed upon the control grids of the pair of tubes comprising the trigger circuit. Such single trigger circuit is inherently binary and the counts effected by one complete cycle of a complete counter operation are determined by the number of such trigger circuits which are interconnected to form the complete counter circuit.

Methods have previously been employed for converting an inherently binary counter to a decade counter. One such method comprises separately feeding back pulses from a plurality of higher trigger circuits to a plurality of lower trigger circuits, e. g. feedback is provided from the fourth trigger circuit to the third and from the third to the second. Such a method introduces artificial counts in the circuit at two different times and changes the stable condition of two different trigger circuits. The fact that a plurality of different trigger circuits initiates the artificial counts in the counter circuit tends to slow down the speed of the counter and complicate the circuit adjustment and design.

Another method of the prior art for converting a binary counter to a decimal counter involves the use of pulse interaction between normal operating pulses and artificially produced pulses to both switch and to block or prevent normal binary operation of the counter circuit. The successful counting operation of such an arrangement is dependent upon the relative value of the pulses opposing each other and of necessity involves extremely critical component values or a multiplicity of adjustments which complicate the problems of fabrication and maintenance.

A principal object of the invention is to modify an inherently binary counter to effect decade counting wherein the above disadvantages of the prior art are avoided.

A broad object of the invention is to provide a novel feedback circuit arrangement for converting an inherently binary counter into a decade counter.

Another object is to provide a decade counter comprising a series of inherently binary trigger circuits wherein feedback is employed from one trigger circuit only, to a plurality of lower trigger circuits at one predetermined time during a cycle of counter operation or at different times during that cycle.

A further object is to provide means in the feedback circuit to prevent operation of the trigger circuits associated therewith in response to spurious pulses generated by the operation of the counter.

Other objects of the invention will be pointed out in the following description and claims and illustrated in the accompanying drawings, which disclose, by way of example, the principle of the invention and the best mode which has been contemplated, of applying that principle.

Figure 1:
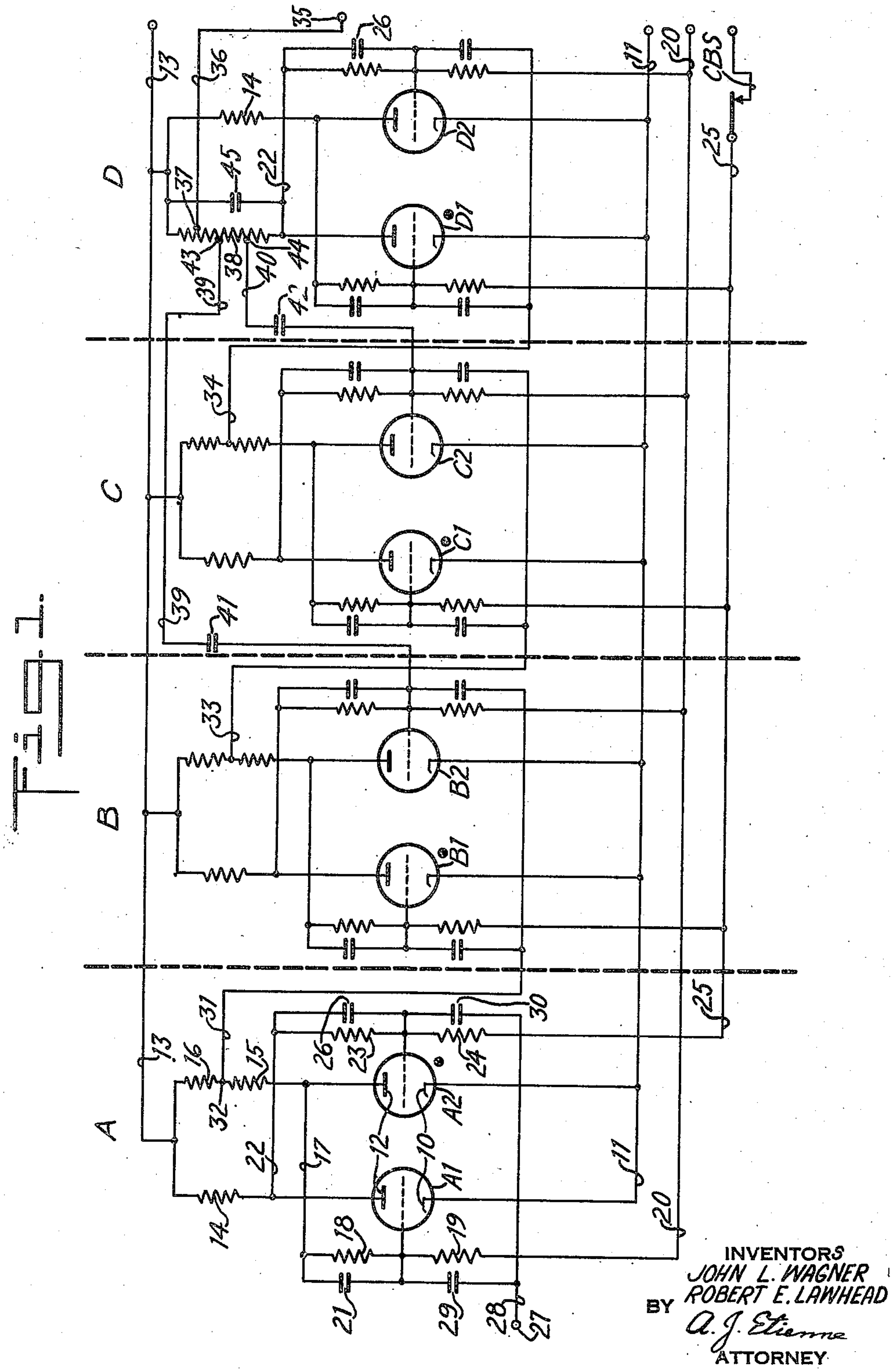
Fig. 1 is a circuit diagram of an electronic counting circuit illustrating one embodiment of the invention.

Referring to the drawings and more particularly to Fig. 1, this embodiment of the novel counter comprises four trigger circuits A, B, C and D connected in cascade shown in the drawing for simplicity of illustration as divided by broken vertical lines. Each trigger circuit A, B, C and D includes two grid-controlled tubes designated A1 and A2, B1 and B2, C1 and C2 and D1 and D2, respectively. The tubes are all of the same type and may, for example, be single tubes such as 6J5's or if desired two tubes may be confined in one envelope, as in the dual type tubes. In the latter case the entire circuit may comprise four 12SN7's.

Each trigger circuit A to D has two stable conditions which are assumed alternately, in which one tube is conductive and the other is non-conductive and then the tubes reverse their conductive conditions. These conditions are referred to herein as "on" and "off."

The "on" condition is assumed to be when the right-hand tube A2, for example, of trigger circuit A is conductive, and the left-hand tube A1 is non-conductive. The "off" condition is assumed when the right-hand tube is non-conductive and the left-hand tube is conductive.

The conductive condition of the respective tubes of the trigger circuits at the initial stage of the counter is indicated on the drawings by a dot to the right of the particular tube of each trigger circuit which is conductive.

It will be apparent from the subsequent description that the "on" condition corresponds to the transferring state of the trigger circuit, in other words the assumption of the "on" condition by a trigger circuit causes a change in the stable condition of the trigger circuit immediately following it. The "off" condition corresponds to the counting state of the trigger circuit, at which time no effect is transferred to any subsequent trigger circuit.

The arrangement and operation of the trigger circuit A will be described with reference to the values of applied voltage and the values of resistances and capacitances employed therein. These values are given solely for the purpose of clarifying the explanation and it is to be specifically understood that they may be varied considerably without departing from the principles of the invention. The actual values are determined, among other things, by the upper and lower speeds of the entries to be counted.

Cathodes 10 of tubes A1 and A2 are connected to a zero volt line 11 and plates 12 are connected to a +150 volt line 13, the plate of A1 being connected thereto through a resistor 14 and the plate of A2 through the resistors 15 and 16 in series, the combined value of which is equal to the value of the resistor 14. Resistors 14, 15, and 16 are of 0.02, 0.015 and 0.005 megohm, respectively. A lead 17 connects the plate of tube A2 to the upper end of a voltage divider consisting of resistors 18 and 19, each of 0.2 megohm. The lower end of the divider is connected to the bias line 20 which is at a potential of −100 volts. A capacitor 21 of 0.001 microfarad shunts resistor 18.

Similarly, a lead 22 connects the plate of tube A1 to the upper end of a voltage divider consisting of resistors 23 and 24, each of 0.2 megohm. The lower end of the divider is connected to a cancel bias line 25 which is at a potential of −100 volts when switch CBS is closed, as shown. A capacitor 26 of 0.001 microfarad shunts resistor 23.

Input terminal 27 is connected to the source of entries to be counted. In the present device these entries may comprise a series of negative pulses having characteristics suitable to effect actuation of trigger circuit A when applied to a lead 28 connected to the terminal 27. These negative pulses are applied via lead 28 to the control grids of tubes A1 and A2 through capacitors 29 and 30, respectively, each having a value of 0.0005 microfarad. A trigger output lead 31 is connected at one end to a point 32 intermediate the load resistors 15 and 16, and at its other end to the input coupling capacitors connected to the control grids of tubes B1 and B2 of trigger circuit B. In this manner, the output of trigger A controls trigger circuit B, i. e., determines whether B is in the "on" or "off" condition.

Trigger A is normally in the "on" condition as indicated by the dot to the right of the right-hand tube A2. Hence from the well known trigger action, tube A1 is biased to cut off since tube A2 in conductive. Triggers B, C and D are normally "off," as shown. The control grids of tubes A2, B1, C1 and D1 are connected to the cancel bias line 25, which provides for quick resetting to the preselected starting or normal condition just described. To reset the circuit to the preselected normal condition, the cancel bias line 25 is disconnected from its −100 volt supply, for example, by opening of the switch CBS. When switch CBS is thus opened the grid bias voltage applied to tubes A2, B1, C1 and D1 rises above the cut-off bias and these tubes are rendered conductive irrespective of their condition immediately prior to the time when switch CBS was opened to disconnect line 25 from its supply.

A similar cancel bias system is provided for each embodiment of the invention and in each case the purpose served is the same, the particular changes being in the connections between the particular grids of chosen tubes and the cancel bias line, to determine different preselected starting conditions of the respective trigger circuits.

It should be observed that the tubes having their control grids connected to the cancel bias line 25 are conductive when the counter is in the zero or preselected normal starting position. The closing of switch CBS does not remove the positive bias on the selected tubes which permits them to remain conductive until an entry changes the stable condition of the trigger. For example the control grid of tube A2 is placed at a potential determined by the voltage divider comprising resistors 14, 23 and 24 connected between the lines 13 and 25. Hence the actual voltage at the control grid, excluding the effect of the resulting grid current, is determined by the voltage divider action of resistors 14, 23 and 24 and is approximately 42 volts positive.

As described herein, negative pulses are used to effect a change in the stable condition of the counter. Positive pulses having a valve equal to that of the negative pulses will not effect a change in the stable condition of any trigger because the grid bias of the non-conducting tube is sufficiently below cut-off to prevent its conduction in response to the positive pulse. As an example, if such a positive pulse is applied to the grid of tubes A1 and A2, when trigger A is "on" as shown, it is not sufficient to cause tube A1 to become conductive.

When a first negative pulse, however, is applied to the control grids of tubes A1 and A2 it has no direct effect on A1, since its grid is already biased below cut-off. However, receipt of the first negative pulse causes the grid of tube A2 to be biased below cut-off and that tube is thereupon rendered non-conductive. The plate voltage of tube A2 consequently rises rapidly toward that of line 13. This rising voltage is transferred from the plate of tube A2 to the control grid of tube A1, through the parallel connected resistor 18 and capacitor 21. The grid of tube A1 is thus made sufficiently positive to start conduction through that tube. Conduction in tube A1 causes its plate voltage to decrease. This decrease is transferred to the control grid of tube A2, through the parallel connected resistor 23 and capacitor 26 and maintains tube A2 non-conductive. Tube A1 remains conductive and tube A2 non-conductive until the next negative pulse is received. It is now obvious that the first negative pulse switches trigger A, as a whole, from the "on" condition to the "off" condition, the "on" condition, as set forth above, having been assumed as tube A2, conductive and tube A1, non-conductive.

In a similar manner, the arrival of the second negative pulse renders tube A1 non-conductive and the resulting rise in its plate voltage is transferred to the control grid of tube A2 to permit that tube to become conductive and thereby hold tube A1 in a non-conductive state, also the decrease in the plate voltage of tube A2 caused by its conduction is transferred to the control grid of tube A1. It is to be particularly noted that this decrease in the plate voltage of tube A2 is also transferred to the control grids of tubes B1 and B2 via the output lead 31. This decrease, as explained for trigger A, impressed simultaneously on the control grid of the conducting tube B1 and on the control grid of the non-conducting tube B2 causes tube B1 to become non-conductive and tube B2 conductive thereby placing trigger circuit B in the "on" condition. Similarly, the decrease in the plate voltage of tube B2, caused by its conduction, is transferred via output lead 33 to the control grids of trigger C and, in the manner explained above, causes conducting tube C1 to become non-conductive and non-conductive tube C2 to become conductive thereby changing trigger C from the "off" to the "on" condition. Similarly, the decrease in the plate voltage of tube C2, caused by its conduction, is transferred via output lead 34 to the control grids of trigger D and causes that trigger to be changed from the "off" to the "on" condition. Output terminal 35 is connected through an output lead 36 to a point 37 on a plate load resistor 38 of tube D1.

The third negative input pulse applied to trigger A changes it from the "on" to the "off" condition and the succeeding trigger circuits are unaffected by the positive voltage transferred over lead 31.

The fourth negative pulse changes trigger A from the "off" to the "on" condition and a negative pulse is again applied to trigger B over lead 31 to change it from the "on" condition to the "off" condition. Since only a positive pulse is produced on the output lead 33 of trigger B no other circuit action is caused by receipt of the fourth pulse.

Subsequent negative pulses applied to terminal 27 cause a continuance of the sequence of operation until trigger D is changed from the "on" to the "off" condition, and applies a negative pulse to output terminal 35 connected to the plate resistor 38 of tube D1.

From the above, it will be clear that each trigger circuit alternately assumes the "on" and "off" condition in response to its receipt of negative pulses and as will be apparent presently, the tenth pulse, impressed on input terminal 27, changes trigger D to the "off" condition, whereupon it supplies a negative pulse to the output terminal 35.

Means must be provided in order that the pulse appearing at terminal 35 will provide an indication, not in the binary but in the decimal system, of the pulses impressed on terminal 27. These means will ensure that a negative pulse will appear at terminal 35 in response to each tenth negative pulse impressed on input terminal 27.

Novel means are now provided to convert binary to decimal operation. Referring to Fig. 1, there is provided simultaneous feedback to both triggers B and C from trigger D. The plate resistor 38 of tube D1 has leads 39 and 40 connected thereto. Lead 39 is connected through a capacitor 41 to the control grid of the tube B2 of trigger B and lead 40 is connected through a capacitor 42 to the control grid of the tube C2 of trigger C.

The leads 39 and 40 are connected to different potential points 43 and 44 respectively on resistor 38 and output terminal 35 is connected to a third potential point 37 on that resistor. These connections divide resistor 38 into four segments of resistance to provide isolation resistance between the triggers B and D, the triggers C and D and the triggers B and C to effect such dissipation of the spurious responses caused by a change in the stable condition of triggers B and C so that trigger D will be substantially uninfluenced by them and triggers B and C will be uninfluenced by each other.

If leads 39 and 40 were connected directly to the plate of tube D1, the spurious responses from triggers B and C would be transferred over leads 39 and 40 respectively, then over lead 22 and capacitor 26 to the control grid of tube D2 and would cause a change in the stable condition of trigger D in response to the operation of triggers B or C. The operation of trigger B in addition to effecting a change in the stable condition of trigger D would effect a change in the stable condition of trigger C as a result of the spurious response transferred over the lead 39 and the lead 40 to the control grid of tube C2. In a similar manner operation of trigger C, in addition to effecting a change in the stable condition of trigger D, would effect a change in the stable condition of trigger B. The connection of feedback leads 39 and 40 to different potential points 43 and 44 respectively on resistor 38 effectively providing isolating resistors which prevent the operation of triggers B and C from changing the stable condition of trigger D, irrespective of the starting or zero condition of the circuit, and permits the normal operation of trigger D to effect the conversion to the decimal system as described hereinafter.

While it is shown that operation by the spurious responses is prevented by connecting the feedback leads to different potential points on plate resistor 38 it is understood that those leads may be connected to a single potential point at trigger D and provided with separate isolating resistors.

A capacitor 45 connected in parallel with resistor 38 provides a low resistance path to the +150 volt line 13 for any spurious responses which may pass through the isolating resistances referred to above. The capacitor 45 is used therefore as an additional safety factor to insure uniformly correct counter operation and permit the use of circuit elements of less critical value than those used in known counters.

The actual sequence of circuit conditions utilized to accomplish the decimal counting are best understood by reference to the following table where X indicates the "on" condition and 0 indicates the "off" condition.

| Counter Setting | Trigger Circuits | | | |
|---|---|---|---|---|
| | A | B | C | D |
| 0 | X | 0 | 0 | 0 |
| 1 | 0 | 0 | 0 | 0 |
| 2 | X | X | X | X |
| 3 | 0 | X | X | X |
| 4 | X | 0 | X | X |
| 5 | 0 | 0 | X | X |
| 6 | X | X | 0 | X |
| 7 | 0 | X | 0 | X |
| 8 | X | 0 | 0 | X |
| 9 | 0 | 0 | 0 | X |
| 0 | X | 0 | 0 | 0 |

Upon starting, that is in the preselected zero position, trigger A is "on" and triggers B, C and D are "off." During receipt of the first nine input pulses, the operation of the circuit is strictly binary as is seen from the above table. When the tenth pulse, however, is impressed on input terminal 27, trigger A is switched to the "on" condition. This causes a pulse to be transmitted to B, switching it "on," B in turn switches C "on" which in turn switches D "off." When D is switched "off," the voltage across plate resistor 38 decreases and a negative pulse is applied, simultaneously, to the control grids of trigger circuits B and C, thereby switching both B and C back to the "off" condition, the final result being that they are left in the condition in which they were immediately after receipt of the ninth input pulse as is seen from comparison of counter settings 9 and the succeeding 0 in the above table. The switching of trigger B, in effect, adds two counts and the switching of trigger C, in effect, adds four counts, a total of six thus being, in effect, added simultaneously by separate self-induced pulses acting solely in response to the binary operation.

It is emphasized that duo-decimal counting may be effected by disconnecting the lead 39 from the control grids of trigger B. When this is done the feedback pulse from trigger D switches trigger C to add four counts thereby providing a pulse at output terminal 35 each time twelve pulses are applied to input terminal 27. As will be seen hereinafter lead 39 of Figs. 2 and 3 may be disconnected to provide for duo-decimal counting.

Figure 2:
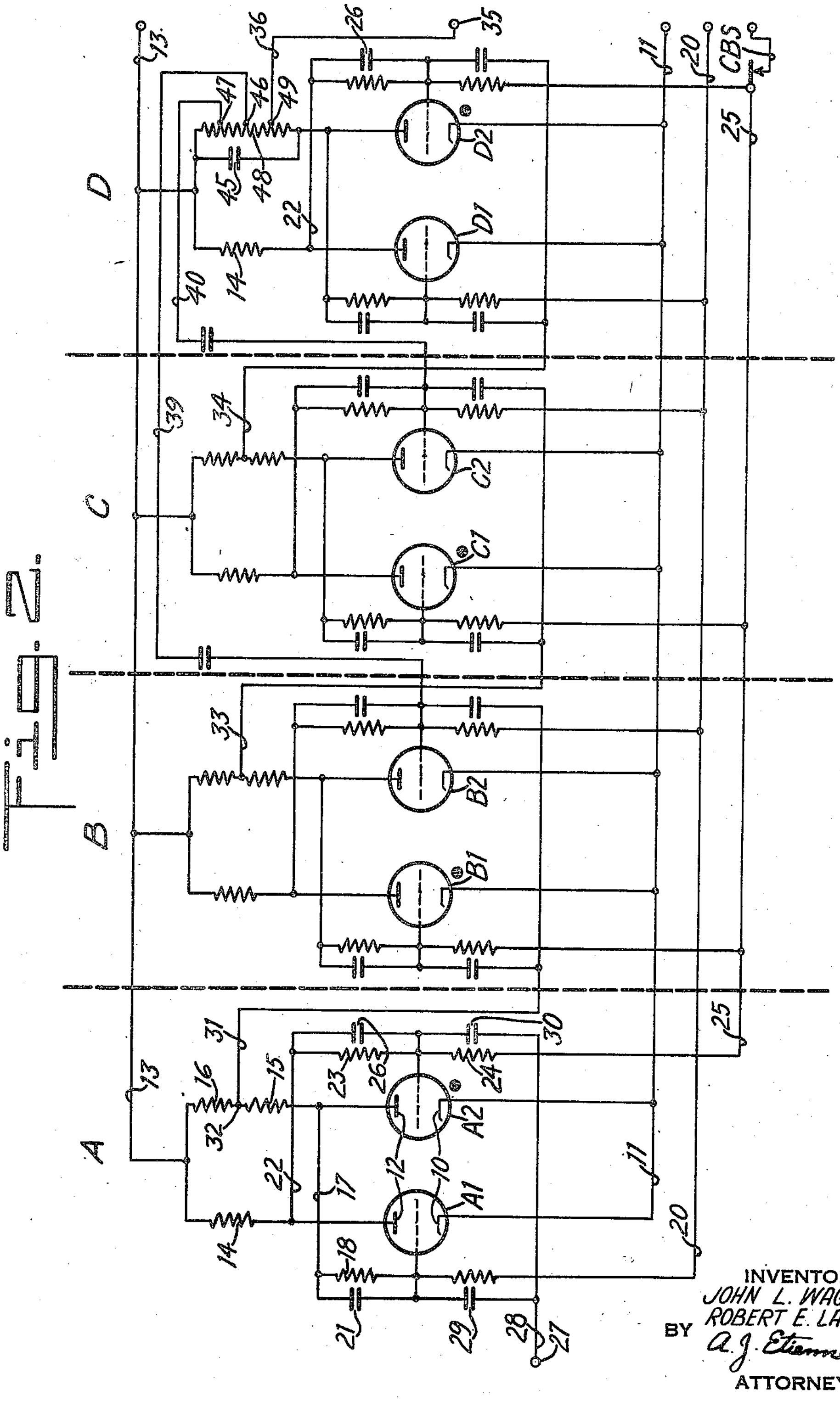
Fig. 2 is a circuit diagram of another embodiment of the invention.

Fig. 2 illustrates another embodiment of the invention using simultaneous feedback to effect conversion from binary to the decimal system of counting. As will be pointed out presently, the normal starting or preselected zero condition of the triggers in Fig. 2 is different from that in Fig. 1. Feedback leads 39 and 40 are connected to potential points 46 and 47, respectively, of a resistor 48 in the plate circuit of tube D2, while output terminal 35 is connected to a third potential point 49 of that resistor.

The following table clearly summarizes one complete cycle of operation:

| Counter Setting | Trigger Circuits | | | |
|---|---|---|---|---|
| | A | B | C | D |
| 0 | X | 0 | 0 | X |
| 1 | 0 | 0 | 0 | X |
| 2 | X | X | X | 0 |
| 3 | 0 | X | X | 0 |
| 4 | X | 0 | X | 0 |
| 5 | 0 | 0 | X | 0 |
| 6 | X | X | 0 | 0 |
| 7 | 0 | X | 0 | 0 |
| 8 | X | 0 | 0 | 0 |
| 9 | 0 | 0 | 0 | 0 |
| 0 | X | 0 | 0 | X |

As is seen from the zero counter setting in the above table, the preselected starting condition is different from that taken for the circuit of Fig. 1, i. e. triggers A and D are preselected in the "on" condition and the triggers B and C are preselected in the "off" condition. This is accomplished by connecting the control grids of tubes A2, B1, C1 and D2 to the −100 volt, cancel bias line 25, the control grids of the other tubes being connected to line 20. As is seen from the above table, normal binary circuit operation occurs in response to the first nine input pulses.

The tenth input pulse switches trigger A to the "on" condition and in turn, A switches B "on," B switches C "on," and C switches D "on." When D goes "on," the voltage across plate resistor 48 decreases and negative pulses are fed simultaneously to the control grids of the triggers B and C over leads 39 and 40, respectively. This causes B to switch "off" and C to switch "off," leaving the entire counter circuit in the 0 condition following the 9 condition as shown in the table above. Since the tenth pulse turned D "on" and returned the entire counter circuit to the 0 condition, a pulse is produced at the output terminal for every tenth pulse applied to the input.

Figure 3:
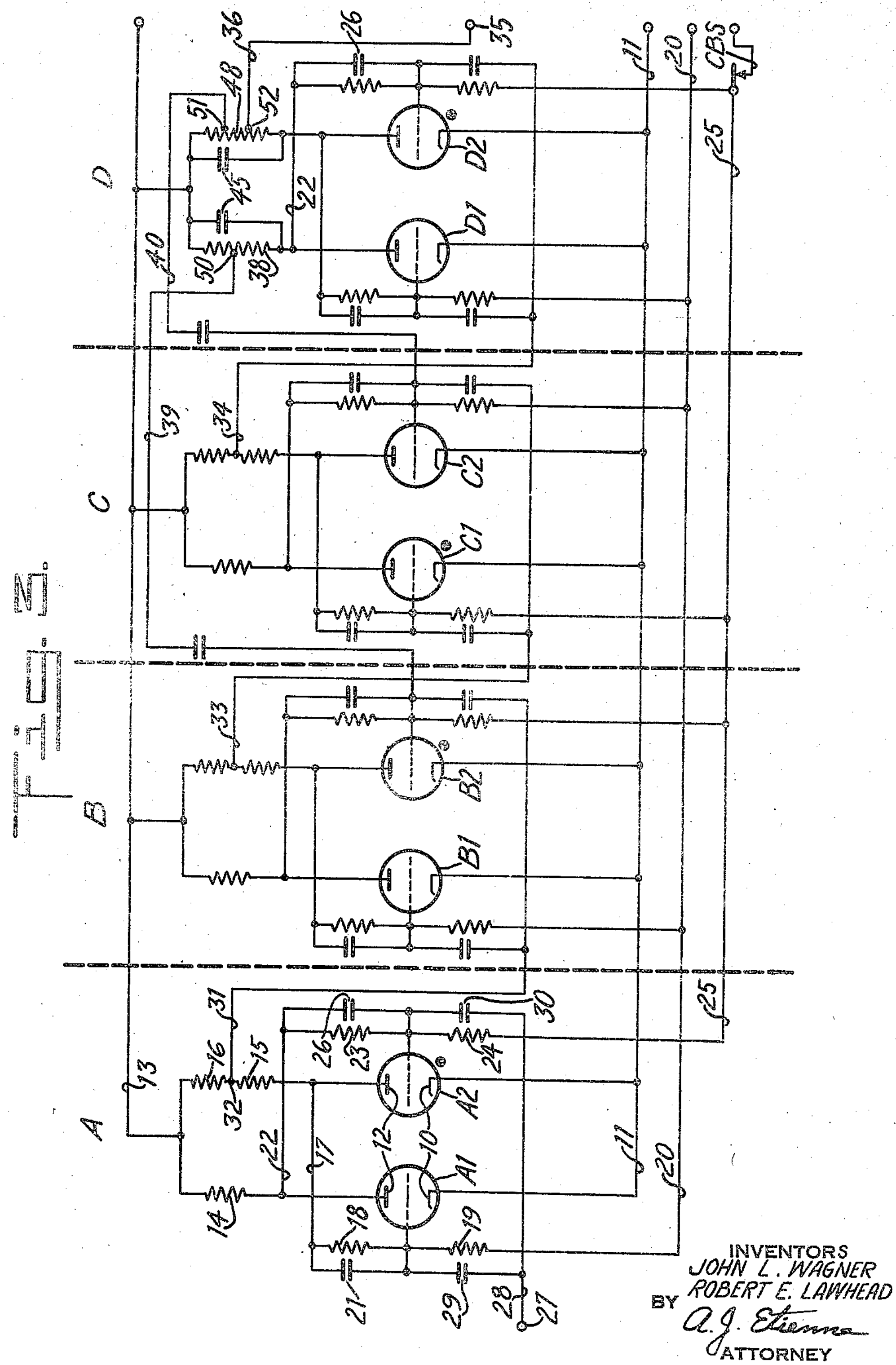
Fig. 3 is a circuit diagram of still another embodiment of the invention.

Fig. 3 illustrates another embodiment in which the stable condition of a plurality of trigger circuits is switched by the action of a higher trigger circuit feeding back to the lower circuits from the plate circuits of both its tubes. As will be pointed out presently, the normal starting or preselected zero condition of the triggers in Fig. 3 is different from that in both Fig. 1 and Fig. 2. Further the respective feedbacks are no longer simultaneous but occur at different time intervals. Feedback lead 39 is connected to a potential point 50 on resistor 38 in the plate circuit of tube D1, and feedback lead 40 is connected to a potential point 51 on resistor 48 in the plate circuit of tube D2, lead 36 connected to output terminal 35 is connected to a second potential point 52 on resistor 46.

The following table clearly summarizes one complete cycle of operation:

| Counter Setting | Trigger Circuits | | | |
|---|---|---|---|---|
| | A | B | C | D |
| 0 | X | X | 0 | X |
| 1 | 0 | X | 0 | X |
| 2 | X | 0 | 0 | X |
| 3 | 0 | 0 | 0 | X |
| 4 | X | 0 | X | 0 |
| 5 | 0 | 0 | X | 0 |
| 6 | X | X | 0 | 0 |
| 7 | 0 | X | 0 | 0 |
| 8 | X | 0 | 0 | 0 |
| 9 | 0 | 0 | 0 | 0 |
| 0 | X | X | 0 | X |

As is seen from the zero counter setting in the above table, the preselected starting condition is different from that in both the circuits of Figs. 1 and 2. In this embodiment the control grids of tubes A2, B2, C1 and D2 are connected to the −100 volt cancel bias line 25 and the control grids of the other tubes are connected to line 20. As is seen from the above table, normal binary operation occurs in response to the first three pulses impressed on terminal 27.

The fourth pulse switches A to the "on" condition and in turn A switches B "on," B switches C "on," and C switches D "off." When trigger circuit D is switched "off," tube D1 becomes conductive and the voltage across plate resistor 38 decreases, causing a negative pulse to be fed back over lead 39 to trigger B. This negative pulse switches B to the "off" condition. The condition of each of the triggers is then as shown for counter setting 4 of the above table. The switching of trigger B has the effect of adding the count of 2 to the operating cycle of the circuit. Normal binary operation is thereupon resumed until receipt of the tenth pulse. The tenth pulse switches A "on" and in turn A switches B "on," B switches C "on," and C switches D "on." When trigger D is switched "on," conduction through tube D2 causes a decrease in the voltage across its plate resistor 48, and a negative pulse is fed back over lead 40 to trigger C, causing it to be switched "off," which has the effect of adding a count of 4 to the operating cycle thereby placing the entire circuit in the 0 condition, as shown in the table above.

While there have been shown and described and pointed out the fundamental novel features of the invention as applied to a plurality of modifications, it will be understood that various omissions and substitutions and changes in the circuits and details of the devices illustrated and in its operation may be made by those skilled in the art without departing from the spirit of the invention. It is the intention therefore to be limited only as indicated by the scope of the following claims.

What is claimed is:

1. A counter including four trigger circuits; each circuit having a pair of grid controlled tubes of the triode type so connected together and arranged that one of said tubes is conductive and the other non-conductive at any instant, each of said tubes being placed alternately in conductive and non-conductive condition in response to the receipt of negative pulses, one of said conditions representing the "off" condition of said trigger circuit and the other the "on" condition; pulse transferring means connecting said trigger circuits for actuating the next higher circuit each time the lower circuit changes from the "off" to the "on" condition; an input terminal for applying pulses to the first of said trigger circuits; an output terminal connected to the highest of said trigger circuits for effecting pulse transfer in response to each tenth pulse applied to said input terminal; bias cancel voltage means associated with a control grid of each of said trigger circuits for placing simultaneously each of said circuits in one predetermined condition of stability; a capacitive connection only from a potential point in the plate circuit of a higher trigger to the control grid of one tube of a lower trigger circuit and a capacitive connection only from a potential point in the plate circuit of said higher trigger to the control grid of one tube of another lower trigger circuit for changing the "on" and "off" conditions of the said lower trigger circuits in predetermined cyclic fashion.

2. In a counter including a series of interconnected trigger circuits consecutively operable in response to pulses to be counted, which pulses are applied to the first of a series of trigger circuits, each of said circuits comprising a pair of grid controlled tubes of the triode type and having "on" and "off" conditions of stability; a plate load for each of said tubes; cancel bias means for placing said counter in a preselected starting condition and for returning said counter to said starting condition from any other cyclic condition; an output connection connected to the highest of said trigger circuits; a capacitive feedback connection from a potential point on a plate load of said highest trigger circuit to a lower trigger circuit for introducing a predetermined number of artificial counts into said counter and a capactive feedback connection from a potential point on a plate load of said highest trigger circuit to another lower trigger circuit for introducing a second predetermined number of artificial counts into said counter, said last mentioned potential point being different from said first mentioned potential point.

3. A decade counting device including a series of four trigger circuits, each circuit having first and second grid controlled tubes and having "on" and "off" conditions of stability alternately assumed in response to negative actuating pulses, the first of said circuits being in the "on" condition at starting and the second, third and fourth of said circuits being in the "off" condition at starting; parallel connected capacitive and resistance elements connecting the plate of said first tube to the control grid of said second tube; plate load and grid bias resistors connected respectively in the plate and grid circuits of said tubes; a condenser connected in parallel with the plate resistor of the first tube of the fourth trigger circuit; means for applying high, intermediate and low potentials respectively to the plates, cathodes and grids of said tubes; an input terminal for each of said trigger circuits, said input terminal being connected to apply voltages to the control grid of each tube of the trigger circuits; a capacitive coupling intermediate said input terminal and the control grid of said first and second tubes; an output terminal connected to said fourth trigger circuit; means for applying a series of pulses to the input terminal of the first trigger circuit; output connections from one plate circuit of each trigger circuit, except the fourth, to the input terminal of the next higher trigger circuit, each trigger circuit actuating the next higher one each time it is changed from only one preselected stable condition to the other; a connection from the plate circuit of the first tube of said fourth trigger circuit to said output terminal and simultaneous feedback means from one trigger circuit to a plurality of preceding trigger circuits for causing every tenth pulse impressed on the input terminals of said first trigger circuit to supply a pulse to said output terminal, said feedback means comprising a connection from a first potential point on the plate resistor of the first tube of said fourth trigger circuit to the control grid of the second tube of said third trigger circuit and a connection from a second potential point on the plate resistor of said first tube of said fourth trigger circuit to the control grid of the second tube of said second trigger circuit.

4. A counter including four trigger circuits; each circuit having first and second grid controlled tubes of the triode type so connected together and arranged that one only of said tubes is conductive at any instant, each of said tubes being placed alternately in the conductive and non-conductive states in response to the receipt of negative pulses, the conductive state of the first tube and the non-conductive state of the second tube representing the "off" condition of said circuit and the conductive state of the second tube and the non-conductive state of the first tube representing the "on" condition of said circuit; pulse transferring means connecting the first trigger circuit to the second, the second to the third and the third to the fourth for actuating the next higher trigger circuit each time the lower one is changed from the "off" to the "on" condition; an input terminal connected to the control grids of the first trigger circuit; means for applying negative pulses to be counted to said input terminal; an output terminal connected to the first tube of the fourth trigger circuit for effecting pulse transfer in response to each tenth negative pulse applied to said input terminal; a cancel bias switch for disconnecting the bias voltage to one tube of each trigger circuit to cause that tube to be conductive, said switch being connected to the control grid of the second tube of the first trigger circuit and to the control grids of the first tube of the second, third and fourth trigger circuits, respectively, the opening of said switch placing said counter in a preselected starting condition with the first, second, third and fourth trigger circuits being the "on," "off," "off" and "off" conditions, respectively; a capacitive connection from the plate of the first tube of said fourth trigger circuit to the control grid of the second tube of the third trigger circuit to transfer a negative pulse, produced by the changing of the fourth trigger circuit from the "on" to the "off" condition in response to the tenth negative pulse applied to said input terminal, to the control grid of the second tube of said third trigger circuit to change it from the "on" to the "off" condition and a second capacitive connection from the plate of the first tube of said fourth trigger circuit to the control grid of the second tube of the second trigger circuit to transfer a negative pulse, produced by the changing of the fourth trigger circuit from the "on" to the "off" condition in response to the tenth negative pulse applied to said input terminal, to the control grid of the second tube of said second trigger circuit to change it from the "on" to the "off" condition and isolating resistors connected in series with said capacitive connections.

5. A counter including a series of four trigger circuits; each of said circuits having first and second grid controlled tubes of the triode type and having "off" and "on" conditions of stability alternately assumed in response to negative actuating pulses, said "off" condition corresponding to the conducting state of said first tube and the non-conducting state of said second tube and said "on" condition corresponding to the non-conducting state of said first tube and the conducting state of said second tube; parallel connected capacitive and resistance elements connecting the plate of the first tube to the control grid of the second tube; plate load and grid bias resistors connected respectively in the plate and grid circuits of said tubes; means for applying high, intermediate and low potentials respectively to the plates, cathodes and grids of said tubes, said low potentials preventing the actuation of said trigger circuits in response to positive pulses; an input terminal for each of said circuits; capacitive coupling for joining said input terminal and the control grids of said first and second tubes; an output terminal supplied from the plate circuit of the second tube of the fourth trigger circuit; means for applying a series of negative pulses to the input terminal of the first trigger circuit; output connections from the plate circuit of the second tube of each trigger circuit, except the fourth, to the input terminal of the next higher trigger circuit; a connection from a potential point in the plate circuit of said second tube of said fourth trigger circuit to the control grid of the second tube of the third trigger circuit to effect a change in the stable condition of said third trigger circuit each time said fourth trigger circuit changes from the "off" to the "on" condition, and a connection from a potential point in the plate circuit of said second tube of said fourth trigger circuit to the control grid of the second tube of the second trigger circuit to effect a change in the stable condition of said second trigger circuit each time said fourth trigger circuit changes from the "off" to the "on" condition, said last-mentioned potential point being different from said first-mentioned potential point.

6. A decade counting device including a series of four trigger circuits, each of said circuits having a first and second grid controlled tube and having "on" and "off" conditions of stability alternately assumed in response to negative actuating pulses; parallel connected capacitive and resistance elements connecting the plate of said first tube to the control grid of said second tube; plate load and grid bias resistors connected respectively in the plate and grid circuits of said tubes; a capacitor connected in parallel with the plate load of the second tube of the fourth trigger circuit; means for applying, high, intermediate and low potentials respectively to the plates, cathodes and grids of said tubes; an input terminal for each of said trigger circuits, said input terminal being connected to apply voltages to the control grid of each tube of the trigger circuits; a capacitive coupling intermediate said input terminal and the control grid of said first and second tubes; an output circuit to be actuated from said fourth trigger circuit; means for applying a series of pulses to the input terminal of the first trigger circuit; output connections from one plate circuit of each trigger circuit, except the fourth, to the input terminal of the next higher trigger circuit, each trigger circuit actuating the next higher one each time it is changed from one preselected stable condition to the other; a connection from a first potential point on the plate load of said second tube of said fourth trigger circuit to said output circuit; and simultaneous feedback means for advancing the operational cycle of the trigger circuits by a count of six, said feedback means comprising a connection from a second potential point on the plate load of the second tube of said fourth trigger circuit to the control grid of the second tube of the third trigger circuit and a connection from a third potential point on the plate load of said second tube of said fourth trigger circuit to the control grid of the second tube of the second trigger circuit.

7. A counter including four trigger circuits; each circuit having first and second grid controlled tubes of the triode type so connected together and arranged that one only of said tubes is conductive at any instant, each of said tubes being placed alternately in the conductive and non-conductive states in response to the receipt of negative pulses, the conductive state of the first tube and the non-conductive state of the second tube representing the "off" condition of said circuit and the conductive state of the second tube and the non-conductive state of the first tube representing the "on" condition of said circuit; pulse transferring means connecting the first trigger circuit to the second, the second to the third and the third to the fourth for actuating the next higher one of the trigger circuits each time the lower one is changed from the "off" to the "on" condition; an input terminal connected to the control grids of the first trigger circuit; means for applying negative pulses to be counted to said input terminal; a cancel bias switch for disconnecting the bias voltage to one tube of each trigger circuit to cause that tube to be conductive, said switch being connected to the control grid of the second tube of the first and fourth trigger circuits and to the control grid of the first tube of the second and third trigger circuits, the opening of said switch placing said counter in a preselected starting condition represented by the first, second, third and fourth trigger circuits being in the "on," "off," "off" and "on" conditions respectively; a plate load resistor connected between the plate of the second tube of the fourth trigger circuit and a source of positive voltage, said resistor having taps thereon representing respectively high, intermediate and low potentials when said fourth trigger circuit is in the "on' condition; a capacitor connected in shunt with said resistor; an output terminal connected to the low voltage tap for effecting the transfer of a negative pulse in response to each tenth negative pulse applied to said input terminal; a capacitive connection from the intermediate voltage tap on said plate load resistor to the control grid of the second tube of the second trigger circuit to transfer a negative pulse thereto to change it from the "on" to the "off" condition in response to a change of said fourth trigger circuit from the "off" to the "on" condition caused by each tenth negative pulse impressed on said input terminal, and a capacitive connection from the high voltage tap on said plate load resistor to the control grid of the second tube of the third trigger circuit to transfer a negative pulse thereto to change it from the "on" to the "off" condition in response to a change of said fourth trigger circuit from the "off" to the "on" condition caused by each tenth negative pulse impressed on said input terminal.

8. A decade counting device including a series of four trigger circuits; each of said circuits having a first and second grid controlled tube and having "off" and "on" conditions of stability alternatively assumed in response to negative actuating pulses; parallel connected capacitive and resistance elements connecting the plate of said first tube to the control grid of said second tube; plate load and grid bias resistors connected respectively in the plate and grid circuits of said tubes; means for applying high, intermediate and low potentials respectively to the plates, cathodes and grids of said tubes; an input terminal for each of said circuits, said input terminal being connected to apply voltages to the control grid of each tube of the trigger circuits, capacitive coupling intermediate said input terminal and the control grids of said first and second tubes, an output terminal supplied from a first potential point on the plate load of the second tube of the fourth trigger circuit; means for applying a series of pulses to the input terminal of the first trigger circuit; output connections from one plate circuit of each trigger circuit, except the fourth, to the input terminal of the next higher trigger circuit, each trigger circuit actuating the next higher one each time it is changed from only one preselected condition of stability to the other; a feedback connection from a second potential point on the plate load of said second tube of said fourth trigger circuit to the control grid of the second tube of the third trigger circuit; a feedback connection from a potential point on the plate load of the first tube of said fourth trigger circuit to the control grid of the second tube of the second trigger circuit; a capacitor connected in parallel with the plate load of the first tube of the fourth trigger circuit and a capacitor connected in parallel with the plate load of the second tube thereof; said feedback connections serving to impress self-induced impulses upon said second and third trigger circuits to cause a change in their stability.

9. A counter including four trigger circuits; each circuit having first and second grid controlled tubes of the triode type so connected together and arranged that one only of said tubes is conductive at any instant, each of said tubes being placed alternately in the conductive and non-conductive states in response to the receipt of negative pulses, the conductive state of the first tube and the non-conductive state of the second tube representing the "off" condition of said circuit and the conductive state of second tube and the non-conductive state of the first tube representing the "on" condition of said circuit; pulse transferring means connecting the first trigger circuit to the second, the second to the third and the third to the fourth for actuating the next higher trigger circuit each time the lower one is changed from the "off" to the "on" condition; an input terminal connected to the control grids of the first trigger circuit; means for applying negative pulses to be counted to said input terminal; an output terminal connected to the second tube of the fourth trigger circuit for effecting pulse transfer in response to each tenth negative pulse applied to said input terminal; a cancel bias switch for disconnecting the bias voltage to one tube of each trigger circuit to cause that tube to be conductive, said switch being connected to the control grid of the second tube of the first, second and fourth trigger circuits and to the control grid of the first tube of the third trigger circuit, respectively, the opening of said switch placing said counter in a preselected starting condition represented by the first, second, third and fourth trigger circuits being in the "on" "on" "off" and "on" conditions, respectively; a capacitive connection from the plate of the first tube of said fourth trigger circuit to the control grid of the second tube of the second trigger circuit to transfer a negative pulse, produced by the changing of the fourth trigger circuit from the "on" to the "off" condition in response to the fourth negative pulse applied to said input terminal, to the control grid of the second tube of said second trigger circuit to change it from the "on" to the "off" condition; and a capacitive connection from the plate of the second tube of said fourth trigger circuit to the control grid of the second tube of the third trigger circuit to transfer a negative pulse, produced by the change of the fourth trigger circuit from the "off" to the "on" condition in response to the tenth negative pulse applied to said input terminal, to the control grid of the second tube of said third trigger circuit to change it from the "on" to the "off" condition and isolating resistors connected in series with said capacitive connections.

JOHN L. WAGNER.
ROBERT E. LAWHEAD.

REFERENCES CITED

The following references are of record in the file of this patent:

UNITED STATES PATENTS

| Number | Name | Date |
|---|---|---|
| 2,409,229 | Smith et al. | Oct. 15, 1946 |
| 2,410,156 | Flory | Oct. 29, 1946 |

OTHER REFERENCES

Review of Scientific Instruments, vol. 10, June 1939, "Switching Action of the Eccles-Jordan Trigger Circuit," by Toomin, pages 191 and 192.

Physical Review, vol. 57, 1940, "New Vacuum Tube . . . Fractional Scaling Ratio," by Lifschutz, pages 243 and 244.

Electronics, June 1944, "A Four Tube Counter Decade," by Potter, pages 110–113, 358 and 360.

RCA Review, vol. VII, No. 3, September 1946, "Electronic Counters," by Grosdoff, pages 438–447.